(12) United States Patent
Shafeeu

(10) Patent No.: US 8,116,363 B2
(45) Date of Patent: Feb. 14, 2012

(54) METHOD OF DETERMINING TRUE ERROR VECTOR MAGNITUDE IN A WIRELESS LAN

(75) Inventor: Hassan Shafeeu, Reading (GB)

(73) Assignee: Synad Technologies Limited, Berkshire (GB)

( * ) Notice: Subject to any disclaimer, the term of this patent is extended or adjusted under 35 U.S.C. 154(b) by 770 days.

(21) Appl. No.: 11/597,604

(22) PCT Filed: May 27, 2005

(86) PCT No.: PCT/GB2005/002132
§ 371 (c)(1),
(2), (4) Date: Sep. 13, 2007

(87) PCT Pub. No.: WO2005/117322
PCT Pub. Date: Dec. 8, 2005

(65) Prior Publication Data
US 2009/0316589 A1    Dec. 24, 2009

(30) Foreign Application Priority Data
May 27, 2004    (EP) .................................... 04253148

(51) Int. Cl.
*H04B 3/46*    (2006.01)
(52) U.S. Cl. ........................ 375/227; 375/296; 714/715
(58) Field of Classification Search .................. None
See application file for complete search history.

(56) References Cited

U.S. PATENT DOCUMENTS

| | | | |
|---|---|---|---|
| 7,428,270 B1 * | 9/2008 | Dubuc et al. ................. 375/316 |
| 2002/0064233 A1 * | 5/2002 | Terreault et al. ............. 375/261 |
| 2002/0090909 A1 | 7/2002 | Dapper et al. | |
| 2003/0016770 A1 * | 1/2003 | Trans et al. ................. 375/346 |
| 2003/0129943 A1 * | 7/2003 | Park et al. ................... 455/13.4 |
| 2004/0125742 A1 * | 7/2004 | Schmidt ....................... 370/208 |
| 2004/0193965 A1 * | 9/2004 | Coersmeier ................. 714/48 |
| 2004/0203472 A1 * | 10/2004 | Chien ............................ 455/68 |
| 2005/0200507 A1 * | 9/2005 | Premy et al. ................. 341/120 |

FOREIGN PATENT DOCUMENTS

| | | |
|---|---|---|
| EP | 0 905 940 A2 | 3/1999 |
| EP | 905940 A2 * | 3/1999 |

(Continued)

OTHER PUBLICATIONS

Georgiadis, Apostolos, "Gain, Phase Imbalance, and Phase Noise Effects on Error Vector Magnitude", IEEE Transactions on Vehicular Technology, vol. 53, No. 2, p. 443-449, Mar. 2004.*

(Continued)

*Primary Examiner* — Seema S Rao
*Assistant Examiner* — Khoa Huynh
(74) *Attorney, Agent, or Firm* — Gardere Wynne & Sewell LLP

(57) ABSTRACT

Systematic transmit IQ phase and amplitude imbalances in the transmit chain of a wireless local area network (WLAN) cause a corresponding systematic shift in the roots of a constellation diagram. Additional random phase noise in the transmit chain will cause a further Gaussian distribution of points in the constellation diagram about the systematically shifted roots. This random distribution represents a true error vector magnitude (EVM). By transmitting a known training sequence through the transmit chain, which it is known will be shifted to all of the systematically shifted roots in the constellation diagram, the Gaussian spread around those shifted roots can be analysed to determine the true EVM.

16 Claims, 3 Drawing Sheets

FOREIGN PATENT DOCUMENTS

EP    1 154 580 A1    11/2001

OTHER PUBLICATIONS

Georgiadis, Apostolos, "Gain, Phase Imbalance, and Phase Noise Effects on Error Vector Magnitude", IEEE Transactions on Vehicular Technology, Vo153, No. 2, p. 443-449, Mar. 2004.*

"Digital cellular telecommunications system (Phase 2+); Radio Transmission and Reception (3GPP TS 05.05 version 8.13.0 Release 1999); ETSI TS 100 910" ETSI Standards, European Telecommunications Standards Institute, Sophia-Antipo, FR, vol. 3-G; 3-G1; SMG2, No. V8130, Jun. 2002, XP014005634; ISSN: 0000-0001; pp. 87-88.

International Search Report and Written Opinion, PCT/GB2005/002132, dated Jul. 14, 2005.

European Search Report and Written Opinion, EP 04 25 3148, dated Nov. 8, 2004.

\* cited by examiner

| Channel constellation in $N^{th}$ sub-carrier | Data constellation in $N^{th}$ sub-carrier | Shifted Data constellation |
|---|---|---|
| Same as $(-N^{th})$ sub-carrier | Same as $(-N^{th})$ sub-carrier | D1 |
| Different to $(-N^{th})$ sub-carrier | Same as $(-N^{th})$ sub-carrier | D2 |
| Same as $(-N^{th})$ sub-carrier | Different to $(-N^{th})$ sub-carrier | D2 |
| Different to $(-N^{th})$ sub-carrier | Different to $(-N^{th})$ sub-carrier | D3 |

1

METHOD OF DETERMINING TRUE ERROR VECTOR MAGNITUDE IN A WIRELESS LAN

FIELD OF THE INVENTION

The present invention relates to a method of determining a True Error Vector Magnitude (EVM) in a wireless Local Area Network (WLAN).

BACKGROUND OF THE INVENTION

Modern high speed wireless Local Area Networks (WLANs) are comprised of a number of individual devices. These can be either clients or access points, and they communicate with each other via wireless links. In order to use these wireless links, each device must have both a transmitter and a receiver. Furthermore, to achieve-optimal performance, the operating characteristics of the transmitting/receiving circuitry must be known. This requires the testing of each transmitter (and receiver) component prior to incorporation into a final WLAN product.

The clients and access points that make up a WLAN communicate with the other clients or access points over the wireless links using one of the many standardized protocols that have been developed for use in WLANs. Some of these protocols, such as 802.11a and g, make use of an OFDM modulation technique to encode the data to be transmitted onto a plurality of sub-carriers to convey the information to the receiver. Each sub-carrier is at a separate frequency that is orthogonal to, and equally spaced from, the other sub-carrier frequencies. An orthogonal frequency set is such that all frequencies other than the wanted frequency pass through zero at the wanted frequency. This ensures that the wanted frequency can be separated without the need for individual sub-band filters. It is the amplitude and phase of these individual sub-carriers which determine the data being carried by them.

In WLAN systems according to the 802.11a or g specifications, there are 52 individual sub-carriers, normally identified as −26 to −1 and +1 to +26.

In general, the data stream to be transmitted is split up into a plurality of data sub-streams, each sub-stream consisting of a first, lower data rate, and a second, higher data rate. The individual sub-streams are created by scrambling the original input data stream to prevent long runs of 1's or 0's, and encoding the scrambled data using an error correcting code, for example Forward Error Correction (FEC). The coded data is then symbol and frequency interleaved to reduce individual susceptibility to so-called burst errors. The interleaved data stream is then mapped and modulated onto each of the frequency carriers using a suitable modulation technique. Depending on the requirements of the transmission link, different modulation techniques can be used. One such technique is Binary Phase Shift Keying (BPSK).

When using BPSK, the sub-carrier amplitude is nominally set to 1 and the phase of the sub-carrier is set to either 0 or 180 degrees, depending on whether the data the sub-carrier is carrying is a 1 or 0. In such a modulation technique, each sub-carrier carries one bit of information.

The amplitude and phase of the transmitted data are normally expressed as a set of one or more complex numbers in the form (N+iM), where N is the amplitude of the Quadrature part and M is the amplitude of the In-Phase part. The roots of these complex numbers are the points depicted on a Frequency Domain (IQ) diagram, as shown in FIG. 1, which is usually referred to as a constellation in the frequency domain.

The complex numbers that result from BPSK modulation are therefore (1+i0) and (−1+i0) or +1 and −1, that is, the ideal constellation contains just two possible points. This is the case where each bit is encoded to one symbol.

In real WLANs, data is encoded using more complex modulation techniques, such as Quadrature Amplitude Modulation (QAM) or Gaussian Minimum Shift Keying (GMSK), where there are more than two possible root locations, each corresponding to a particular symbol value, and each symbol equating to a set of data bits being sent per transmission time slot, therefore allowing more data to be sent, at the expense of more complex decoding being required.

In systems such as these, where the amplitude and phase of the data can be expressed as a constellation diagram, if an ideal transmitter were to be used, sending its information across an ideal channel, the position of the roots would not change, and therefore the receiver could easily work out what data was being sent by the transmitter, and with no errors. However, real transmitters and channels warp the signal being sent, resulting in roots that are shifted from their ideal positions. The shifts can be seen as rotations about the origin of the IQ axes, or as movement along the length of the axes. These shifts are caused by gain and phase imbalances in the transmit chain, by random phase noise in the transmitter, and by the distortion due to the channel the data is sent over.

In the presence of such shifts, the receiver can incorrectly decode a transmitted root location, because the shifts due to the non-ideal nature of the transmission can result in the roots being moved to (or near) the location of other, equally valid, root locations. These errors are exacerbated in systems with more closely spaced possible root locations, such as QAM. An example of such an erroneous root determination may be understood with reference to FIGS. 2a and 2b. In FIG. 2a, the idealized root of the locations of an arbitrary encoding technique are shown. In FIG. 2b, the actual root locations are shown in solid line of which two are labelled, as 10 and 20. It will be noted that the actual constellation of root locations is rotated about the IQ axes relative to the idealized locations (shown in FIG. 2b in faint). It will also be seen that the actual root locations 10 and 20 are in fact very close to entirely different root locations 30, 40 in the idealized constellation.

The measure of how far a root has moved from its actual, intended location, is called the Error Vector Magnitude (EVM). The measure of this movement as a result of the transmitter only is called the EVM of the transmitter. To allow accurate estimation of the error introduced by the channel, the EVM of the transmitter must be known.

The total EVM of the transmitter is a result of the effects of phase noise, which is random in nature, and from the IQ phase and gain imbalances in the transmit hardware chain, which is systematic in nature.

Since the IQ phase and gain imbalances are systematic in nature, they can be measured, then compensated for in the input signal by pre-distortion of the input signal. The true EVM due to only the random phase noise can then be found. It is this random effect of the phase noise that limits the capability of the transmitter, and thus it is important to test the transmitter for its true EVM to know its limitations or quality. Transmitter Device manufacturers can then remove substandard parts from their production lines.

The procedure for measuring the true EVM of a transmitter that is currently employed first measures the effect of the systematic error introduced by the IQ phase and amplitude imbalances, then pre-distorts the input signal to counteract these errors. The true EVM due to the random phase noise alone is then measured. More specifically, the first test, to measure the IQ phase and amplitude imbalances, involves inputting a single, known frequency and amplitude test tone into both the (and Q inputs. The amplitude and phase offsets are then measured at the output using test equipment. Once these parameters are known, the input signal is then recalculated to pre-distort it to compensate for these errors. The true EVM is then measured in a second test by inputting a test pattern predistorted using the values obtained in the first test, measuring the output and comparing the input to the output. The procedure is thus relatively time-consuming, since it requires two separate tests to be carried out, with a recalculation step in between to take into account the results of the first test. Furthermore, this two step test with a recalculation in between must be carried out for each transmitter separately.

SUMMARY OF THE INVENTION

The present invention, against this background provides a method of determining a true Error Vector Magnitude (EVM) in a transmitter arrangement for a wireless local area network (WLAN), comprising the steps of: (a) supplying a plurality of test signals, each having a test signal amplitude and phase, to a transmitter arrangement of a WLAN; (e) determining the measured amplitude and phase of the test signals once they have passed through the transmitter arrangement; (c) obtaining a data distribution of the measured amplitude and phases of the test signals; (d) determining the spread in the data distribution about peaks in that data distribution; and (e) calculating a true EVM, resulting from non-systematic effects within the transmitter arrangement, based upon the determined spread of the data distribution.

Using this technique, it is no longer necessary to correct for phase or amplitude imbalances, nor to know in advance what the actual imbalance is. Instead, the actual phase and amplitude is analysed, for example by a statistical analysis, using the fact that each of the measured data points is (or at least should be) clustered around one of a finite and known number of roots in the constellation diagram. This allows the true EVM, resulting only from random phase errors and the like, to be determined without first having to calculate and compensate for the systematic distortions resulting from IQ imbalances. As a result, measurement of the true EVM is faster and cheaper.

BRIEF DESCRIPTION OF THE DRAWINGS

The invention may be put into practice in a number of ways, and one preferred embodiment will now be described by way of example only and with reference to the accompanying drawings in which:

FIGS. 4a, 4b, 4c and 4d show constellation diagrams depicting the ideal root locations, as well as the six root locations of FIG. 3, in the presence of amplitude gain, phase shift and both, in a transmitter chain.

DETAILED DESCRIPTION OF THE PREFERRED EMBODIMENT

Figure 1:
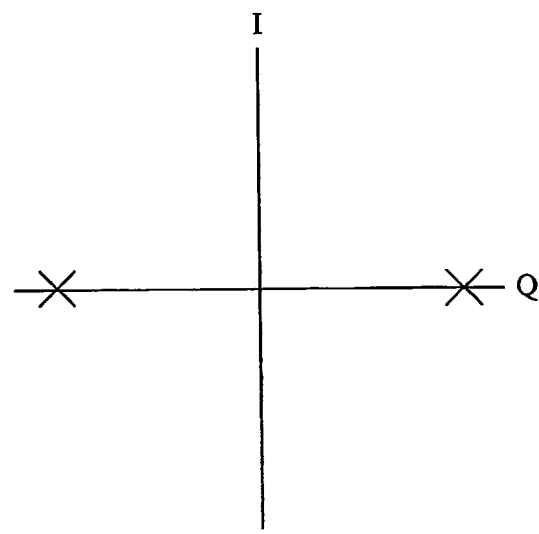
FIG. 1 shows a constellation diagram indicating the ideal locations of the roots in an IQ plot, for BPSK.
Figure 2A:
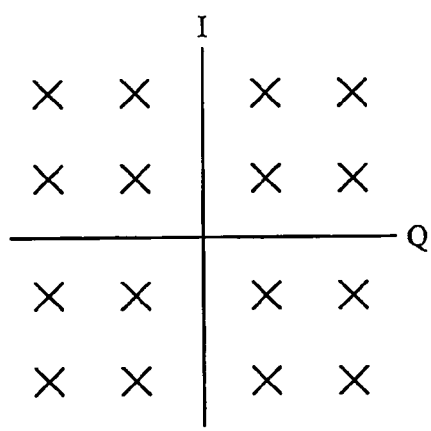
FIG. 2a shows a constellation diagram indicating the ideal root locations of an arbitrary encoding technique.
Figure 2B:
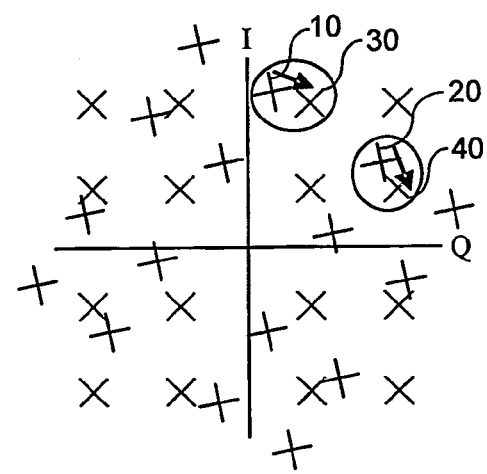
FIG. 2b shows the constellation diagram of FIG. 2a, onto which has been superimposed the shifted root locations as a result of IQ phase and amplitude imbalances.

It can be shown that, in the presence of systematic transmit IQ phase and amplitude imbalances in the transmit chain, the roots of the constellation diagram for a Binary Phase Shift Keyed (BPSK) signal are shifted in the frequency domain to one of the following two possible new positions:

$$c1 = k1(\cos(\psi) + i\sin(\psi)) \cdot c$$
$$c2 = k2(\cos(\psi) - i\sin(\psi)) \cdot c$$

where $$k2 = \sqrt{2/(1+ge)};$$
$$k1 = k2 \cdot ge;$$
$$\psi = \frac{\theta}{2}$$

where c is the original constellation position (+1 or −1) and ge & θ are the IQ gain phase errors respectively.

Whether a point in a constellation is shifted to c1 or c2 is dependent on the value of the sub-carrier and its corresponding negative sub-carrier. For example, in BPSK, the constellation point represented by sub-carrier 26 is shifted dependent on the value of the sub-carrier −26. If the values in sub-carrier 26 and −26 are identical, then the constellation points are shifted to location c1. If the values in 26 and −26 are different, the constellation points are instead shifted to c2 in the IQ diagram.

Distortion is present even when the signal is received and down-converted using an ideal receiver. In the real world, the signal is in fact down mixed to an Intermediate Frequency (IF) and then the final, complex down conversion of the IQ signals is carried out digitally.

The digital down conversion of the IQ signals of an 802.11a/g packet normally occurs using the following known demodulation processes. Firstly, the start of the packet or payload is found by synchronization with the packet preamble using a synchronizer. Next, the frequency offset between the transmitter and receiver is estimated, and a correction for that frequency offset is made. Then the channel is estimated, i.e. the effect of the channel on the IQ signals is calculated. Finally, the OFDM symbols are separated and the data recovered from them using the standard OFDM demodulation process, but taking into account the effect of the distortion due to the channel.

During the course of this known demodulation process, it is assumed that the transmitter is behaving in an ideal fashion, and is not affecting the data in any way. However in reality, this is not the case. In particular, it is necessary for the receiver to know the distortion due to the transmitter, so that these effects can be taken into account when the channel is being estimated.

Again in accordance with known procedures, the channel estimate for any given sub-carrier is found by sending a known training sequence, which results in a known sequence of BPSK constellations, from the transmitter to the receiver. The constellations actually received are then compared with the expected transmission constellations, which gives the necessary information on how the following data constellations can be expected to be modified by the channel in respect of this particular sub-carrier. This process is usually carried out on a regular basis, since the channel is not constant over time. For example, channel estimation can be carried out once per frame.

As discussed above, the constellation corresponding to the channel will be shifted to one of two positions, c1 or c2, due to the IQ phase and amplitude imbalances, depending on the data carried in the sub-carrier to which the channel applies, and its negative sub-carrier. The data constellations following the channel estimate constellations are affected by the transmitter and channel in the same way, i.e. move to a first position c1 if the data of the relevant positive and negative sub-carriers are the same, or move to a second position c2 if the data on the relevant positive and negative sub-carriers are not the same. These effects are associative, so that the measured output constellation can be shifted to one of three positions for each of the possible data symbols, namely $c1 \cdot c1 = d1$, $c1 \cdot c2 = c2 \cdot c1 = d2$, and $c2 \cdot c2 = d3$. The various combinations are set out in the table of FIG. 3.

Figures 3, 4:
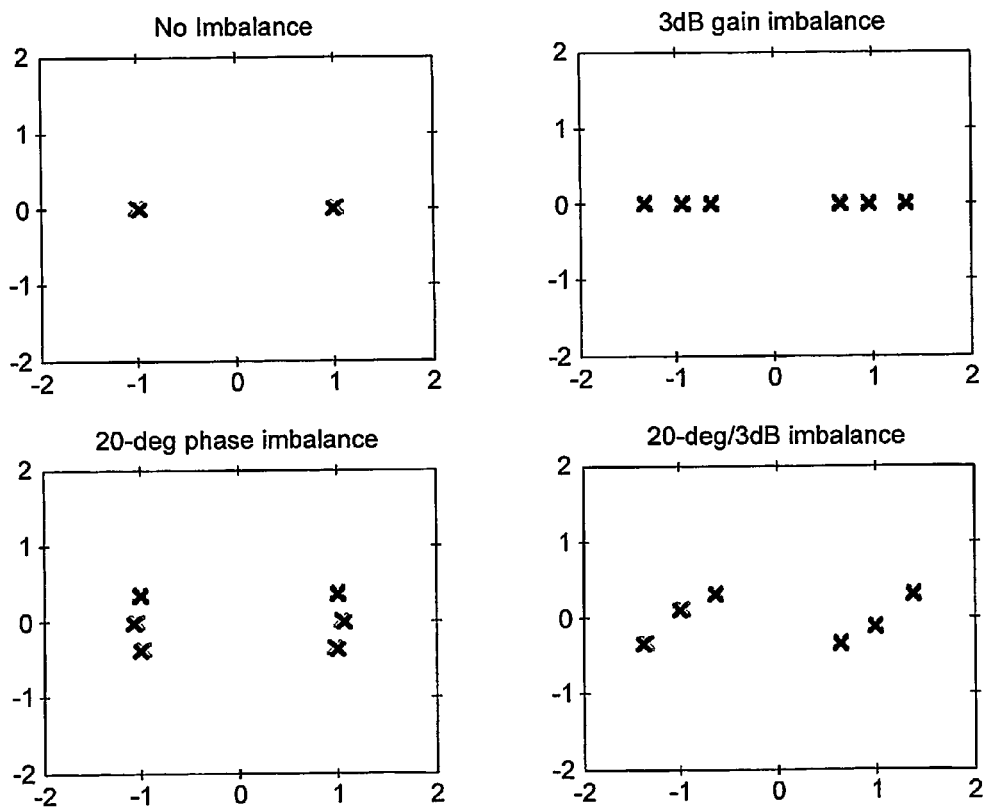
FIG. 3 shows a table indicating the six possible root locations (three positive and three negative) for a single BPSK symbol data constellation when shifted due to IQ phase and amplitude imbalances, both in the data and also in the channel information.

FIG. 4 shows how the constellation points shift from their ideal positions in the presence of either an amplitude gain, a phase shift or both, i.e. IQ phase and amplitude imbalances, but without any (random) phase noise. For the sake of illustration only, a phase shift of 20 degrees and/or an amplitude shift of 3 dB is shown, but it will be understood that the actual phase and amplitude shifts may be any of a wide variety of magnitudes, in a given transmit chain. The ideal roots in the constellation are shown in FIG. 4a, which represents the channel and data constellation absent any distortion in the transmit chain. In accordance with FIG. 3 and Equation 1, +/−D1, +/−D2 and +/−D3 collapse onto the same two locations, +1 and −1. When there is only gain distortion (FIG. 4b), the ideal roots +1 and −1 are moved to +D1, +D2 and +D3, and also −D1, −D2 and −D3, where in this example −D2=−1 and +D2=+1. For a phase only distortion (FIG. 4c), the ideal roots +1 and −1 are shifted to different locations +D1', +D2 and +D3', and −D1', −D2 and −D3', where +D2=+1 and −D2=−1 again. Finally, as seen in FIG. 4d, where there is both phase and gain distortion (the usual case in a real transmit chain), the two ideal roots are shifted to still other locations +D1", +D2 and +D3", −D1", −D2 and −D3", where +D2=+1 and −D2=−1 still, however, in this example.

True points in a constellation diagram for a real transmit chain having, say, the 20 degree and 3 dB phase and amplitude shifts of FIG. 4d, for example, will tend to be clustered around, but not actually at, one of the six points shown in FIG. 4d. This is as a result of the additional random phase noise. Calculating the EVM by linking the real, measured points in the constellation diagram to the ideal roots would however then result in false, large values.

In accordance with the embodiment of the present invention, however, the true EVM can be estimated as follows. As explained above, it is actually known that the data constellations will be shifted to one of a finite, known number of positions, for all transmitted data (in accordance with Equation 1 and FIG. 3). For BPSK, this is six locations +/−D1, +/−D2, and +/−D3 (FIG. 3), but for different modulating techniques, other numbers of systematically shifted root locations will exist. Even though, at this stage, the actual position of each systematically shifted root in the constellation diagram is not known, Equation 1 and FIG. 3 allows a knowledge of the number of such shifted roots that will exist. Using known training sequences that it is known will be shifted to all the possible locations in the constellation diagram (that is, training sequences using all the different combinations of the same and different data in the sub-carriers), the measured output constellations can be used to determine a true EVM. This is because each received data point will be located near to, but not actually at, one of the six possible locations in the constellation diagram of FIG. 4, and it is known to which one of the (in this case) six locations each data point will be shifted, because of Equation 1 and FIG. 3. The distance between each received data point and the possible location in the constellation diagram is a result purely of the random shifts in the transmit-receive chain and is thus representative of a true error vector. This feature enables a statistical analysis to be carried out even though at this stage the location of the finite number of roots in the constellation diagram is not known.

As a first step, each of the points in the constellation is allocated to its associated "ideal" location, that is, the location in the constellation diagram due only to IQ imbalance. In FIG. 4, this is one of −D1, −D2, −D3, +D1, +D2 or +D3. Allocation takes place on the basis of Equation 1 and FIG. 3, that is, although it is not yet known precisely where D1, D2 and D3 (and −D1, −D2, −D3) actually are located (in terms of co-ordinates in a constellation diagram), it is nevertheless known from Equation 1 and FIG. 3 to which of these six points any given data point will be shifted.

Once each data point has been allocated to a one of the six locations, a statistical analysis of each resulting "cluster" can be carried out. In particular, the spread of the data points in each cluster can be calculated, using standard statistical techniques. Typically, this will result in a standard deviation for each cluster being determined, although other parameters indicative of the spread of data points, such as the variance, may be calculated, of course. The true EVM of the transmitter chain can then be estimated by averaging the standard deviations of the data points in each cluster.

Figure 5:
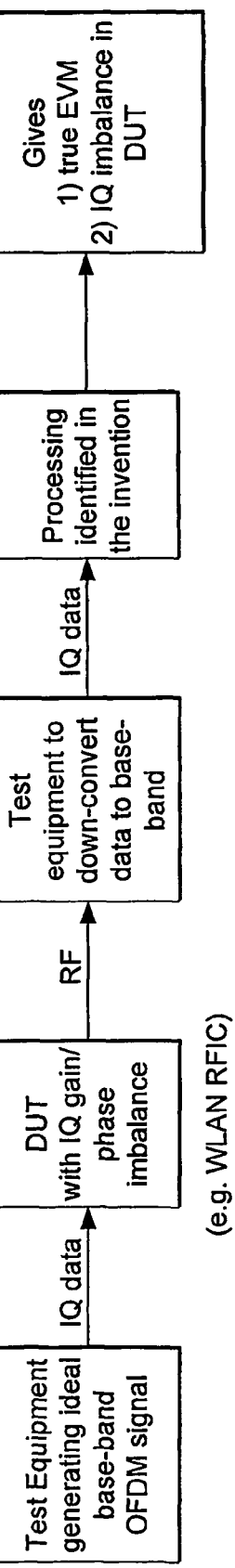
FIG. 5 shows a schematic of a typical transmitter device test setup, in accordance with an embodiment of the present invention.

The present invention is applied using a device test rig as shown in FIG. 5. The Device Under Test (DUT) is positioned between test equipment configured to produce ideal baseband OFDM data and test equipment configured to down convert the resultant output of the DUT back into baseband, ready for processing by equipment which applies the above described process to determine the quality of the DUT.

In order to obtain a reasonably accurate fit to a Gaussian model of the spread of data points in each cluster, it is desirable to ensure that a relatively significant sample size is employed, say, in excess of 1,000 data points.

A further advantageous consequence of such a statistical analysis of the data points in the constellation is that the mean of each of the six clusters may be used to estimate the actual location of the six points in the constellation diagram that result only from IQ imbalances and not also from phase errors. The mean positions determined represent the values +/−D1, +/−D2 and +/−D3, and this allows in turn the systematic gain and phase errors to be estimated, using equation 1.

Using this method, there is no need to correct for the imbalance due to the IQ phase and amplitude imbalances beforehand, in a separate test, and a true EVM can be produced in a single testing step. Also there is now no need for a recalculation of the input signal, to pre-distort the input to compensate for the IQ imbalances found in the earlier test. The test is therefore reduced in complexity, the amount of test equipment required and the time taken per test.

Although the foregoing description of a preferred embodiment has described the procedure in terms of binary phase shift keying, it is to be understood that this is by way of example only, not least because the principles of the invention can most readily be understood when there are only two roots (+1 and −1) in a constellation diagram for that modulation procedure. In particular, various other forms of encoding, including but not limited to Binary Amplitude Shift Keying (BASK), Binary Frequency Shift Keying (BFSK), Quadrature Amplitude Modulation (QAM), Gaussian Minimum Shift Keying (GMSK) and M-ary Phase Shift Keying (M-PSK) may be employed instead, to modulate data onto a sub-channel of an OFDM signal. In the case of 128QAM, for example, which is employed with the V.33 Modem Standard, there are 128 points in a constellation diagram and one of these points is transmitted for every seven input bits. Each of these 128 points may separately be shifted due to systematic errors in the transmit/receive chain, leading to a constellation diagram analogous to FIG. 4 but with a very large number of possible locations to which a data point may be shifted. Nevertheless, the principles defined above may still be employed to allow determination of a true EVM, by carrying out a statistical analysis of the data points in each of the clusters to which any given data point is shifted.

In general terms, where there are n possible "ideal" locations to which data may be shifted (that is, n locations in the absence of random phase noise), provided that it is known to which of the n "ideal" locations any given data point will be shifted, a mean and standard deviation of the cluster at each location can still be calculated, and from that, the values of the true EVM (an average of +/−D1, +/−D2, +/−D3 . . . +/−D(n/2)) can be estimated. The intermediate steps (and in particular pre-distortion of the transmit signal) are accordingly still avoided, even with a potentially very large number of ideal locations, n, in a constellation diagram.

The invention claimed is:

1. A method, comprising the steps of:
(a) supplying a plurality of test signals to a transmitter arrangement of a wireless local area network (WLAN), each test signal including data modulated onto a sub-carrier of an Orthogonal Frequency Division Multiplexed (OFDM) signal and having a test signal amplitude and phase, each sub-carrier having a predetermined position within a bandwidth of the OFDM signal, the plurality of test signals comprising at least a first test signal and a second test signal, and wherein the position of the sub-carrier for the first test signal and the position of the sub-carrier for the second test signal are symmetrically arranged about the mid-point of the bandwidth of the OFDM signal, and wherein the first and second test signals each comprise a known training sequence of data which cause finite shifts at each point of an ideal signal constellation of the test signal;
(b) measuring an amplitude and phase of the test signals once they have passed through the transmitter arrangement;
(c) allocating each of the measured amplitude and phase values to one of a finite plurality of data groups, wherein the allocation to a data group of the measured amplitude and phase values corresponding to the first test signal is based on the first test signal amplitude and phase and the second test signal amplitude and phase;
(d) determining the spread in the said measured values, within each of the data groups; and
(e) calculating an Error Vector Magnitude (EVM), resulting only from non-systematic effects within the transmitter arrangement, based upon the determined spread of the measured values within the data groups.

2. The method of claim 1, further comprising:
determining an average of the measured amplitude and phase values within each of the data groups; and
calculating, from the average, the magnitude of a systematic error vector which is a result of systematic shifts introduced into the phase and amplitude of a signal passing through the transmitter arrangement, due to IQ imbalances.

3. The method of claim 1, wherein the step of determining the spread in the measured values in each data group further comprises:
calculating the standard deviation of the measured values in each data group; and
calculating the EVM based upon an average of the calculated standard deviations.

4. The method of claim 3, wherein the step of calculating the true EVM further comprises:
determining the mean of the calculated standard deviations for each of the finite plurality of the data groups.

5. The method of claim 2, wherein the step of determining an average of the measured amplitude further comprises calculating the position of the mean of the values in each of the finite plurality of data groups.

6. The method of claim 1, wherein each test signal includes test data modulated onto it using a technique comprising:
Binary Phase Shift Keying (BPSK); Binary Frequency Shift Keying (BFSK); Quadrature Amplitude Modulation (QAM), Gaussian Minimum Shift Keying (GMSK), and M-ary Phase Shift Keying (M-PSK),
and wherein the number of data groups is at least in part a consequence of the manner of data modulation.

7. The method of claim 2, wherein the step of determining the spread in the measured values in each data group further comprises:
calculating the standard deviation of the measured values in each data group; and
calculating the EVM based upon an average of the calculated standard deviations.

8. The method of claim 7, wherein the step of calculating the EVM further comprises:
determining the mean of the calculated standard deviations for each of the finite plurality of the data groups.

9. A method, comprising the steps of:
(a) supplying a plurality of test signals to a transmitter, the test signals having an ideal signal constellation;
(b) passing the test signals through the transmitter to produce output test signals for wireless transmission, the output test signals having a shifted signal constellation relative to the ideal signal constellation due to systematic effects of the transmitter;
wherein the test signals comprise a known training sequence of data which causes shifts at each point of the ideal signal constellation to a finite plurality of positions for each point of the shifted signal constellation;
(c) receiving the output test signals affected by non-systematic effects;
(d) measuring an amplitude and phase of the received test signals;
(e) allocating each of the measured amplitudes and phases for the received test signals to one of a finite plurality of data groups each corresponding to one of the finite plurality of positions within the shifted signal constellation;
(f) calculating a spread of the measured amplitudes and phases within each one of the finite plurality of data groups;
(g) estimating an Error Vector Magnitude (EVM) from the calculated spread of each data group, the estimated EVM being solely due to the non-systematic effects.

10. The method of claim 9, further comprising:
determining an average of the measured amplitude and phase values within each of the data groups; and calculating, from the average, the magnitude of a systematic error vector which is a result of shifts in the shifted signal constellation introduced by systematic effects as the test signal passes through the transmitter.

11. The method of claim 10 wherein the step of determining an average of the measured amplitudes and phases further comprises calculating the position of the mean of the amplitudes and phases in each of the finite plurality of data groups.

12. The method of claim 10 wherein the step of determining the spread in the measured amplitudes and phases in each data group further comprises:
    calculating the standard deviation of the measured amplitudes and phases in each data group; and
    calculating the EVM based upon an average of the calculated standard deviations.

13. The method of claim 12, wherein the step of calculating the EVM further comprises:
    determining the mean of the calculated standard deviations for each of the finite plurality of the data groups.

14. The method of claim 9, wherein the step of calculating the spread in the measured amplitudes and phases in each data group further comprises:
    calculating the standard deviation of the measured amplitudes and phases in each data group; and
    calculating the EVM based upon an average of the calculated standard deviations.

15. The method of claim 14, wherein the step of calculating the true EVM further comprises:
    determining the mean of the calculated standard deviations for each of the finite plurality of the data groups.

16. The method of claim 9, wherein each test signal includes test data modulated onto it using a technique comprising:
    Binary Phase Shift Keying (BPSK); Binary Frequency Shift Keying (BFSK); Quadrature Amplitude Modulation (QAM), Gaussian Minimum Shift Keying (GMSK), and M-ary Phase Shift Keying (M-PSK),
    and wherein the number of data groups is at least in part a consequence of the manner of data modulation.

* * * * *